United States Patent Office 3,331,103
Patented July 18, 1967

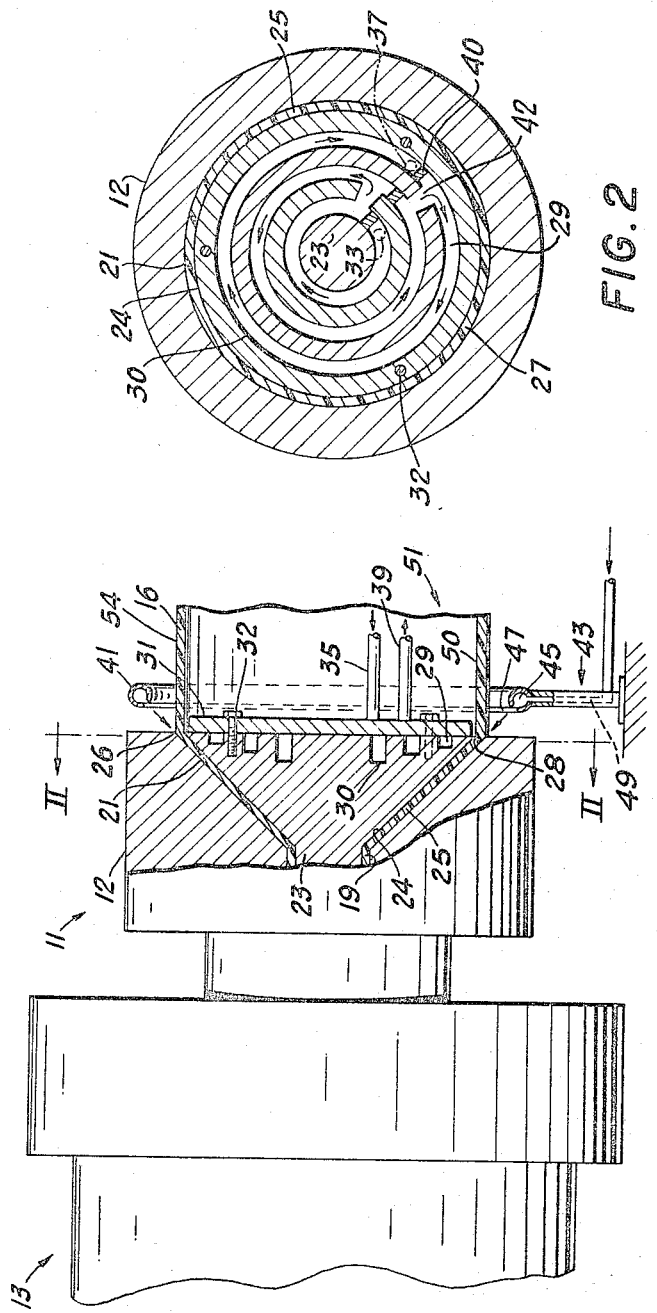

3,331,103
EXTRUSION DIE FOR FOAMABLE THERMO-
PLASTIC COMPOSITIONS
Alan J. Fox, Sewickley, Pa., assignor to Koppers
Company, Inc., a corporation of Delaware
Filed Oct. 21, 1965, Ser. No. 500,138
1 Claim. (Cl. 18—14)

This invention relates generally to extrusion apparatus and, more particularly, to an extrusion die suitable for use in forming smooth surfaced foam films or sheets of thermoplastic styrene polymers.

Foam polystyrene film or sheet is useful as an insulating material or in forming containers suitable for food packaging. Conveniently, the foam film or sheet is made by heat plastifying in an extruder expandable styrene polymer compositions, such as are described in Patent No. 2,941,964 and Patent No. 3,089,857 and extruding the material through a die orifice. The expandable compositions contain a blowing agent system comprised of volatile organic hydrocarbons in combination with adjuncts such as sodium bicarbonate and citric acid which evolves gases when the thermoplastic polymer is heated to its softening point. As the heat plastified material passes through the die orifice into the atmosphere, the gases expand the thermoplastic material into a foam film or sheet having a cellular structure.

Acceptable films can be produced using conventional extrusion orifices but one or both surfaces of the foam film have a tendency to be rough and pitted. This gives the film a dull, unsightly appearance and restricts its commercial use as a packaging material.

It has now been found that smooth surfaced foam film or sheet can be produced using the extrusion die of the invention.

I have discovered that the surface pitting occurs because the metal parts forming the die orifice are heated to different temperatures by the molten plastic. The outer die lip dissipates the heat from the plastic more rapidly due to the exposure of this part of the die to the ambient atmosphere. On the other hand the inner die lip formed by the mandrel is insulated from the atmosphere, since it is enclosed by the outer portions of the extrusion die and the tube of plastic being extruded, and it becomes hotter than the external die lip and actually approaches the temperature of the molten plastic in contact with the die. The resulting temperature difference causes the molten plastic to drag on the inner die lip and the result is a rough, uneven surface on the plastic which is being extruded.

In accordance with this invention the extruder for the extrusion of foam films of thermoplastic material includes a novel die having outer and inner concentric members spaced from each other to form an annulus for the extrusion of the thermoplastic material therethrough and provision for maintaining the members at about the same temperature. Another feature of the invention includes the positioning of an air ring adjacent to the die such that a stream of air can be directed on the film as it emerges from the die lips to effect a further improvement in the film surface.

The above and further objects and novel features of the invention will appear more fully from the following detailed description when the same is read in connection with the accompanying drawing. It is to be expressly understood however that the drawings are not intended as a definition of the invention but are for the purpose of illustration only.

FIG. 1 is an elevational view of an embodiment of the invention with parts broken away;

FIG. 2 is a cross sectional view taken along lines II—II of FIG. 1.

As is conventional in the extrusion art, extruder 13 is fitted with a screw (not shown) for heat plastifying and advancing plastic material 16 to die 11. In the embodiment of the die of FIG. 1, body 12 contains an annular channel 19 for the passage of plastic material from extruder 13 to channel 25. Channel 25 is formed by conical outer surface 21 and conical inner surface 24. Mandrel 23 provides the latter surface. The plastic material flows through the annular passageway 25 and exits between die lip 26 of the die body 12 and die lip 28 of mandrel 23.

In accordance with this invention provision is made to equalize the temperature between the surface of the die lips 26 and 28. Mandrel 23 contains a water channel 29 formed by ring-shaped slots 30 in mandrel 23 and cylindrical cover plate 31, which is attached to the outer face of mandrel 23 by screws 32 threaded into mandrel 23. Cover plate 31 has an aperture 33 (FIG. 2) to which inlet pipe 35 is attached such that cooling water from pipe 35 can pass through cover plate 31 into water channel 29. Cover plate 31 has an aperture 37 (FIG. 2) to which is attached outlet pipe 39 so that hot water from water channel 29 can pass through cover plate 31 to outlet pipe 39.

Inlet and outlet pipes 35 and 39 are connected to a suitable cooling water circulation system (not shown) which cools the hot water issuing from outlet pipe 39 to the desired temperature and recirculates the cold water to water channel 29. The water channel 29 is shown in more detail in FIG. 2, which die body 12 and mandrel 23 form annular orifice 27 through which plastic material 16 is extruded. Cold water passes through inlet pipe 35 (FIG. 1) apperture 33 and into water channel 29 which has a series of walls 40 and slots 42 such that the water circulates in a circular pattern of increasing diameter until it passes out through aperture 37 into outlet pipe 39 (FIG. 1). The cooling water spirals from the central portion of the mandrel to the outer portion.

It has been found that an extremely smooth, fine celled, glossy surface can be produced by blowing air directly on the foam film as it emerges from the die lip 26. Air ring 41 is mounted on support 43 adjacent to extrusion die 11 and has an air channel 45 leading to an annular orifice 47, which is arranged to direct a flow of air under pressure directly at die lip 26. The air is passed into air ring 41 conveniently through a channel 49 in support 43.

In operation, Koppers Dylite F–135 expandable polystyrene (a commercial grade of expandable polystyrene pellets containing six percent by weight of n-pentane, 0.3 percent by weight of encapsulated citric acid, and 0.35 percent by weight of external sodium bicarbonate) was heat plastified in extruder 13 at a temperature of about 330° F. The heat plastified material was advanced by the action of the extruder screw (not shown) to extrusion die 11 through channel 19 to channel 25 and out through annular passage 25 where it passed into the atmosphere and expanded to a foam film having a density of approximately four lbs./cu. ft. The temperature of the heat plastified material as it passed between die lips 26 and 28 was approximately 320° F. Cooling water, at a temperature of 25° C., was passed in through inlet pipe 35 through inlet orifice 33 into water channel 29 at a sufficient rate to bring the temperature of die lip 28 to about 260° F. (i.e., the same as the temperature of die lip 26) and maintain the temperature at about 260° F. The cooling water, which absorbed heat from mandrel 23, passed out through outlet orifice 37 to outlet pipe 39 where it was cooled and recirculated to inlet pipe 35. The extruded foam tube 50 had smooth inner and outer foam surfaces having fine uniform cell size.

To illustrate the prior art, cooling water was removed from the die and the extrusion of expandable polystyrene was continued. The temperature of the die lip 26 remained about 260° F. and the temperature of die lip 28 increased to about 320° F. The inner surface 50 of the foam tube 51 then was rough and pitted.

In another mode of operation, expandable polystyrene (Koppers Dylite F-135) was heat plastified at a temperature of 290° F. in extruder 13 and advanced to extrusion die 11 through channel 19 and out through channel 25 where it passed into the atmosphere and expanded to a foam film having a density of about 4 lbs./cu. ft. The temperature of die lip 28 was maintained at about 280° F., so that it was equal to the temperature of die lip 26 by means of passing cooling water through water channel 29. Air, at a temperature of 25° C. and a pressure of 5 p.s.i.g., was passed through channel 49 in support 43 to air channel 45 of air ring 41 and out through annular orifice 47 so that the air impinged on the outer surface 54 of foam film 50 just as it emerged from die lip 26. The inner surface of foam tube 50 was smooth and had a fine cell size. The outer surface of foam tube 50 was smooth and glossy due to the effect of the air being blown on the surface of the foam as it emerged from die lip 26.

The foregoing has described apparatus for producing extruded foam film or sheet of expandable thermoplastic materials which have improved surface characteristics not heretofore achieved by apparatus employed in the forming of the extrusion of foam film and sheet.

I claim:

A die for the extrusion of foam films of thermoplastic material consisting solely of a block member with a conical cavity therein, said block member being of such a size as to absorb the heat of the thermoplastic material and of such a size as to dissipate said heat to the ambient atmosphere, an interior conical member nested solely within said conical cavity of said block member to form an annulus for the extrusion of heat plastified thermoplastic material, the outer face of said conical member being substantially flush with said block member, means for cooling said conical member including a helical passage for the circulation of cooling fluid, the depth of the helical fluid passage being varied progressively from its center to its edge in such manner that the volume of cooling fluid is greater in the center than at the edge, means for flowing said cooling fluid into the central portion of said passage and out from the outer portion of said passage, and means for directing a flow of air under pressure onto said thermoplastic material as it emerges from said annulus.

References Cited

UNITED STATES PATENTS

| 1,544,002 | 6/1925 | Grove | 18—38 |
| 1,548,215 | 8/1925 | Semler | 18—38 X |
| 1,998,802 | 4/1935 | Brown | 18—38 |
| 2,057,467 | 10/1936 | Williams | 18—14 |
| 2,317,597 | 4/1943 | Ford et al. | 18—38 |
| 2,461,630 | 2/1949 | Cozzo | 18—14 |
| 2,514,841 | 7/1950 | Chase | 18—14 X |
| 2,750,631 | 6/1956 | Johnson | 264—95 |
| 3,181,200 | 5/1965 | Joseph | 18—38 X |

FOREIGN PATENTS

| 1,025,834 | 1/1953 | France. |

WILLIAM J. STEPHENSON, *Primary Examiner.*

J. SPENCER OVERHOLSER, *Examiner.*